(No Model.)

F. L. ROBINSON.
CANAL RACK.

No. 454,185. Patented June 16, 1891.

Witnesses
Frank C. Gibson.
Jno. M. Walsh

Inventor
F. L. Robinson
By his Attorneys
Alexander & Davis

UNITED STATES PATENT OFFICE.

FRANK L. ROBINSON, OF CARIBOU, MAINE.

CANAL-RACK.

SPECIFICATION forming part of Letters Patent No. 454,185, dated June 16, 1891.

Application filed February 25, 1891. Serial No. 382,794. (No model.)

*To all whom it may concern:*

Be it known that I, FRANK L. ROBINSON, a citizen of the United States, residing at Caribou, in the county of Aroostook and State of Maine, have invented certain new and useful Improvements in Canal-Racks, of which the following is a specification, reference being had therein to the accompanying drawings.

Figure 1:
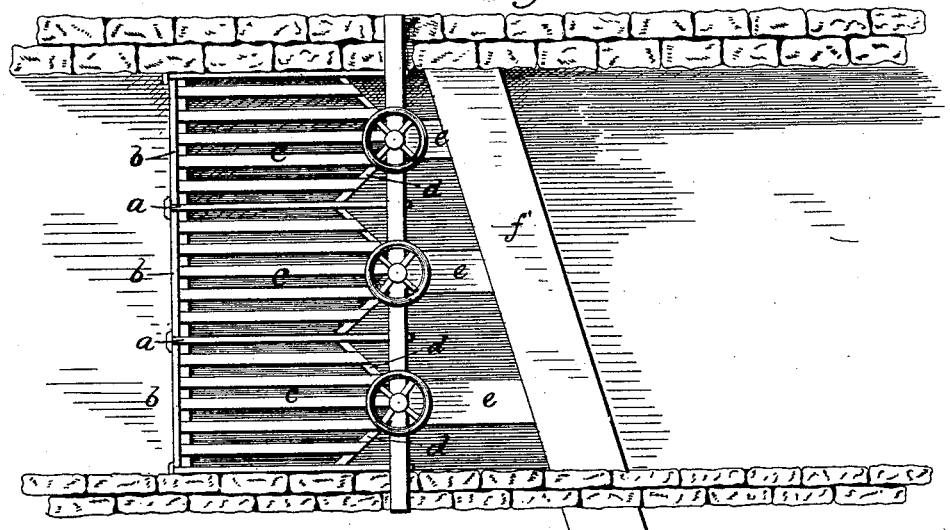
Figure 2:
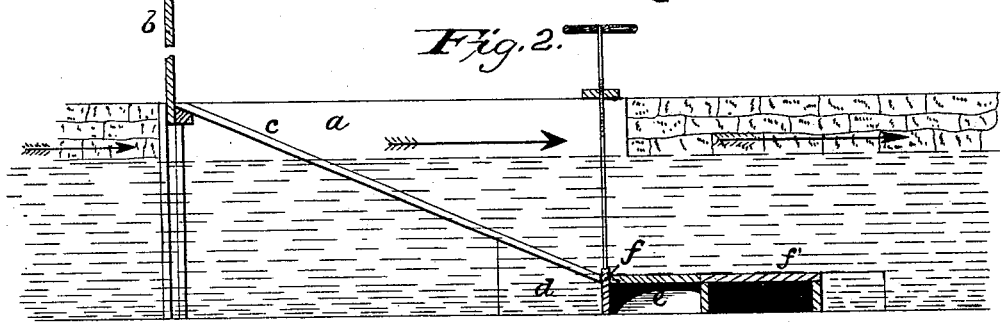

In the accompanying drawings, Figure 1 represents a plan view of a canal provided with my improvements; Fig. 2, a vertical longitudinal sectional view thereof, and Fig. 3 a plan view of a single flume provided with my improvements.

The invention is designed to produce improved and simple means for collecting the refuse of canals and flumes and discharging it therefrom without materially interfering with the flow of water, as will more fully hereinafter appear.

In the drawings, $a\ a$ represent two vertical partition-walls erected in the canal in such a manner as to form three flumes or passages for the water. At the head of each of these passages is arranged a suitable vertically-operating gate $b$, whereby the water may be shut off from any one of them without interfering with the others. Secured in each of the flumes is a grating of slats $c$, which extend entirely across the flume and incline upstream, these slats being attached at their upper ends to cross-bars and at their lower ends to inclined concentrating-boards $d\ d$, secured in the bottoms of the respective flumes. These boards $d$ extend out from the sides of the flumes toward their respective centers and are inclined downstream, serving to direct and guide the collected refuse into penstocks or conduits $e$, leading out of the flumes and located on the bottom of the canal. The heads of these penstocks are closed by vertically-movable gates $f$, suitably controlled from above the water. The longitudinal penstocks all lead into an oblique penstock $f'$, extending across the canal and having its lower end discharging out through one side of the same into an adjacent river or other convenient place of deposit for the refuse. This cross penstock or conduit is located on the bottom of the canal and is formed low and wide, so as not to materially interrupt the flow of water down the canal. This collecting and discharging apparatus is usually built in the canal above the mill, so as to prevent ice and floating refuse entering the same and injuring its machinery.

The gates $b$ at the heads of the flumes are kept raised all the time, and the gates $f$ at the head of the waste-conduits are kept closed. When a quantity of refuse has been collected by the rack and boards in any one of the flumes, the gate $b$ of that flume is closed and its waste-gate $f$ is opened, thereby permitting the water to carry the collected refuse out of the flume into the oblique cross-conduit, from whence it is carried by the outrushing water off to one side out of the canal. This method of collecting refuse and discharging it from the canal has many advantages over the old devices. One advantage is the rapidity with which the refuse collected in any one of the flumes may be discharged, and another and important one is that any one of the flumes may be cleaned without stopping or cutting off the supply of water to the mill.

Figure 3:
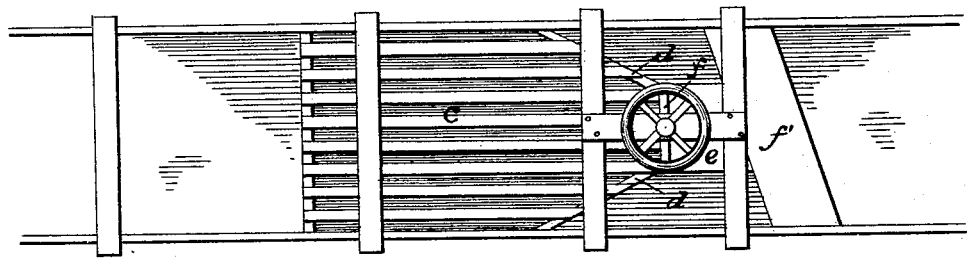

It is evident that without departing from the invention in the least I may employ only one concentrating-board $d$ for each of the flumes instead of two, as shown, and it is also obvious that these boards may be arranged at right angles to the canal instead of being arranged obliquely. It is also obvious that I may employ only a single flume instead of three, as shown in Fig. 3, without departing from the invention, and also that I may vary the number of these flumes to suit the exigencies of each case. A further important advantage of this arrangement of racks and flumes and gates is the effective and convenient manner provided for thoroughly cleaning the racks of any refuse that may cling to them. It will be observed that when any one of the gates $b$ is closed down and its corresponding refuse-gate $f$ opened the outrushing water is drawn up through the rack from below the flumes. This back-draft through the racks serves to clear them of all refuse clinging to them and carry it out through the waste-openings.

Having thus fully described my invention, what I claim is—

1. The combination, with a flume and a grating extending across the same and inclining upstream, of a waste-outlet leading out of the lower end of the flume and closed by a gate, and a lateral conduit connected to this waste-outlet and discharging to one side of the flume, substantially as described.

2. The combination, with a canal, of a vertical partition or partitions arranged therein to form flumes, gates at the heads of these flumes, racks arranged in these flumes and inclining upstream, concentrating-boards arranged at the lower ends of the flumes, waste-outlets controlled by gates, and a lateral conduit communicating with the waste-outlets and discharging to one side of the canal, substantially as described.

3. The combination of a canal, flumes therein, slotted racks in these flumes, these racks inclining upstream, concentrating-boards at the lower ends of the flumes, these boards leading to waste-conduits, gates for these waste-conduits, and a lateral conduit located on the bottom of the canal and communicating with the said waste-conduits, substantially as described.

In testimony whereof I affix my signature in presence of two witnesses.

FRANK L. ROBINSON.

Witnesses:
CHARLES D. ROBINSON,
GEO. B. ROBERTS.